(12) United States Patent
Zhang

(10) Patent No.: US 11,862,805 B2
(45) Date of Patent: Jan. 2, 2024

(54) BATTERY AND ELECTRONIC DEVICE USING THE SAME

(71) Applicant: Ningde Amperex Technology Limited, Ningde (CN)

(72) Inventor: Yuanjie Zhang, Ningde (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 458 days.

(21) Appl. No.: 16/956,692

(22) PCT Filed: Dec. 31, 2019

(86) PCT No.: PCT/CN2019/130784
§ 371 (c)(1),
(2) Date: Jan. 11, 2021

(87) PCT Pub. No.: WO2021/134599
PCT Pub. Date: Jul. 8, 2021

(65) Prior Publication Data
US 2023/0187747 A1 Jun. 15, 2023

(51) Int. Cl.
*H01M 10/00* (2006.01)
*H01M 50/186* (2021.01)

(52) U.S. Cl.
CPC ................. *H01M 50/186* (2021.01)

(58) Field of Classification Search
CPC .. H01M 10/0431; H01M 4/625; H01M 4/134; H01M 4/043; H01M 50/46; H01M 10/0525; H01M 50/55; H01M 50/489; H01M 50/121; H01M 50/119; Y02E 60/10; Y02E 70/50
See application file for complete search history.

(56) References Cited

FOREIGN PATENT DOCUMENTS

| CN | 202205852 U | | 4/2012 | |
|---|---|---|---|---|
| CN | 105355956 A | | 2/2016 | |
| CN | 105449261 A | * | 3/2016 | ............. Y02E 60/10 |
| CN | 105449261 A | | 3/2016 | |
| CN | 205828573 U | | 12/2016 | |
| CN | 206401440 U | | 8/2017 | |

(Continued)

OTHER PUBLICATIONS

Chinese Office Action corresponding to counterpart application 201980044481.7 dated Aug. 25, 2021.

(Continued)

*Primary Examiner* — Cynthia H Kelly
*Assistant Examiner* — Monique M Wills
(74) *Attorney, Agent, or Firm* — Ladas & Parry LLP

(57) ABSTRACT

A battery includes a packaging shell and a battery cell. The battery cell is disposed in the packaging shell, the battery cell includes a first electrode plate, the first electrode plate includes a first empty foil area and a second empty foil area where no active material is disposed on either side of the first electrode plate. The first empty foil area is arranged on a first surface, the second empty foil area is arranged on a second surface. At least one of the first surface and the second surface is adhered to the packaging shell by a bonding member. In a width direction of the battery cell, a width of the battery cell is W, a width of the first empty foil area is W1, a width of the second empty foil area is W2, and $0 \leq (W1+W2)/W \leq 40\%$.

20 Claims, 5 Drawing Sheets

(56) References Cited

FOREIGN PATENT DOCUMENTS

| | | |
|---|---|---|
| CN | 109980230 A | 7/2019 |
| CN | 110071320 A | 7/2019 |
| CN | 110071322 A | 7/2019 |
| KR | 20190090304 A | 8/2019 |
| WO | 2019169546 A1 | 9/2019 |

OTHER PUBLICATIONS

International Search Report for International Application PCT/CN2019/130784, dated Oct. 12, 2020.
Second Office Action of CN application No. 201980044481.7, dated Nov. 26, 2021.
Extended European Search Report of EP application No. 19958380.8, dated Jun. 2, 2023.

* cited by examiner

BATTERY AND ELECTRONIC DEVICE USING THE SAME

FIELD

The subject matter herein generally relates to a battery and an electronic device using the battery.

BACKGROUND

Batteries, due to their high energy density, are widely used in various devices, such as notebooks, mobile phones, unmanned aerial vehicles, mobile power sources, and automobiles. When a battery is dropped or impacted by an external force, an internal battery cell may collide a packaging shell and a blank foil in an outer circle of the battery cell can be easily broken, which is likely to cause a short circuit.

SUMMARY

In view of the problems in conventional batteries, the present disclosure provides a battery capable of reducing the risk of short circuit and an electronic device including the battery.

The present disclosure provides a battery including a packaging shell and a battery cell. The battery cell is arranged in the packaging shell. The battery cell includes a first electrode plate, the first electrode plate includes a first empty foil area and a second empty foil area. Either side of the electrode plate in each of the first empty foil area and the second empty foil area is not provided with active material. The battery cell has a first surface and a second surface opposite to each other, the first empty foil area is arranged on the first surface, the second empty foil area is arranged on the second surface. At least one of the first surface and the second surface is adhered to the packaging shell by a bonding member. In a width direction of the battery cell, the width of the battery cell is W, a width of the first empty foil area is W1, a width of the second empty foil area is W2, and $0 \leq (W1+W2)/W \leq 40\%$.

In some embodiments, $0 \leq (W1+W2)/W \leq 30\%$.

In some embodiments, the bonding member includes a first bonding layer and a second bonding layer, the first surface is adhered to the packaging shell by the first bonding layer, the second surface is adhered to the packaging shell by the second bonding layer.

In some embodiments, in the width direction of the battery cell, the width of the first bonding layer is W3, the width of the second bonding layer is W4, where $80\% \leq W3/W \leq 100\%$, $80\% \leq W4/W \leq 100\%$.

In some embodiments, in a length direction of the battery cell, the length of the battery cell is L, the length of the first bonding layer is L1, the length of the second bonding layer is L2, where $80\% \leq L1/L \leq 100\%$, and $80\% \leq L2/L \leq 100\%$.

In some embodiments, the first electrode plate further includes a third empty foil area, the third empty foil area is connected between the first empty foil area and the second empty foil area.

In some embodiments, the bonding member further includes a third bonding layer, the third empty foil area is adhered to the packaging shell by the third bonding layer.

In some embodiments, the first electrode plate further includes a first current collector and a first active material layer disposed on the first current collector. The first active material layer defines a first groove in which the first current collector is exposed. The battery cell further includes a first electrode tab, the first electrode tab is received in the first groove and is electrically connected to the first current collector.

In some embodiment, the battery cell further includes a second electrode plate and a second electrode tab. The second electrode plate includes a second current collector and a second active material layer disposed on the second current collector. The second active material layer defines a second groove in which the second current collector is exposed, the second electrode tab is received in the second groove and is electrically connected to the second current collector.

In some embodiments, the first electrode plate is a negative electrode plate, the second electrode plate is a positive electrode plate.

In some embodiments, the bonding member is an adhesive tape or an adhesive layer.

In some embodiments, the bonding force of the bonding member is 100 to 1000 N/m, and the tensile rupture stress of the bonding member is less than or equal to 4000 N/m.

In some embodiments, in the thickness direction of the battery cell, the thickness of the bonding member located on the first surface and the thickness of the bonding member located on the second surface are less than or equal to 200 μm.

The present disclosure further provides an electronic device including the above battery.

In the battery of the present disclosure, by optimizing a straight line length of the empty foil area located on the outermost circle and adhered to the packaging shell, a ratio of a width of the empty foil area in the width direction of the battery cell to the width of the battery cell is less than or equal to 40%, which reduces the possibility of generating debris when anyone of the three empty foil areas are impacted, thereby reducing the risk of short circuit.

BRIEF DESCRIPTION OF THE DRAWINGS

Implementations of the present disclosure will now be described, by way of embodiments, with reference to the attached figures.

DETAILED DESCRIPTION

Figure 1:
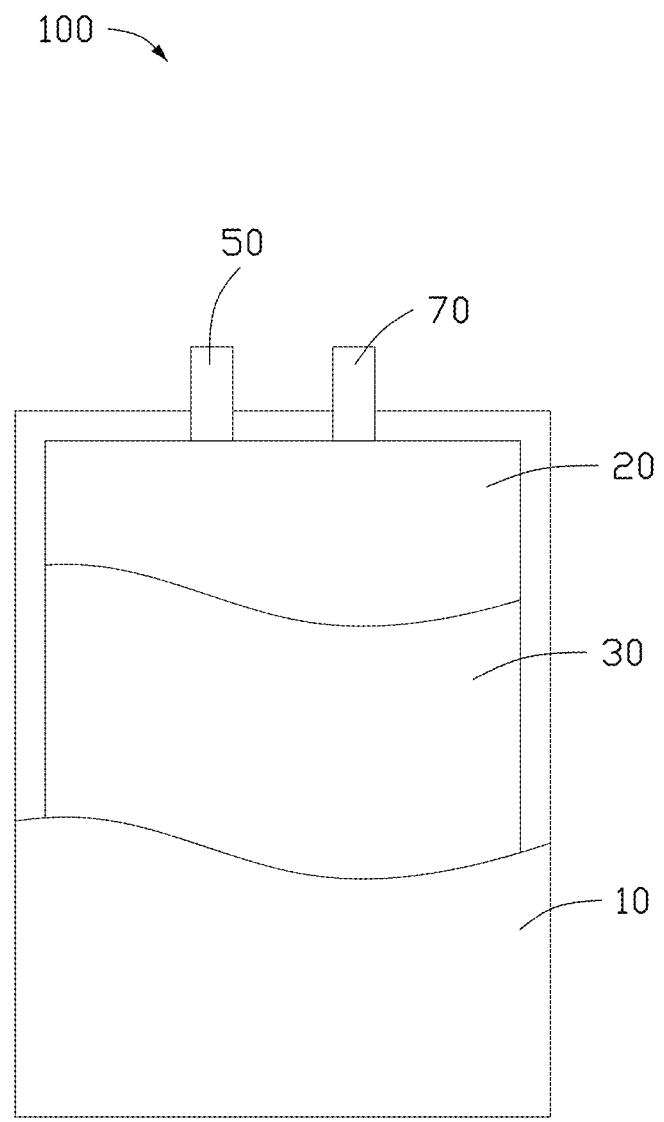
FIG. 1 is a schematic view of an embodiment of a battery according to the present disclosure.

Implementations of the disclosure will now be described, by way of embodiments only, with reference to the drawing. The disclosure is illustrative only, and changes may be made in the detail within the principles of the present disclosure. It will, therefore, be appreciated that the embodiments may be modified within the scope of the claims.

Unless otherwise defined, all technical terms used herein have the same meaning as commonly understood by one of ordinary skill in the art. The technical terms used herein are to provide a thorough understanding of the embodiments described herein, but are not to be considered as limiting the scope of the embodiments.

Figure 2:
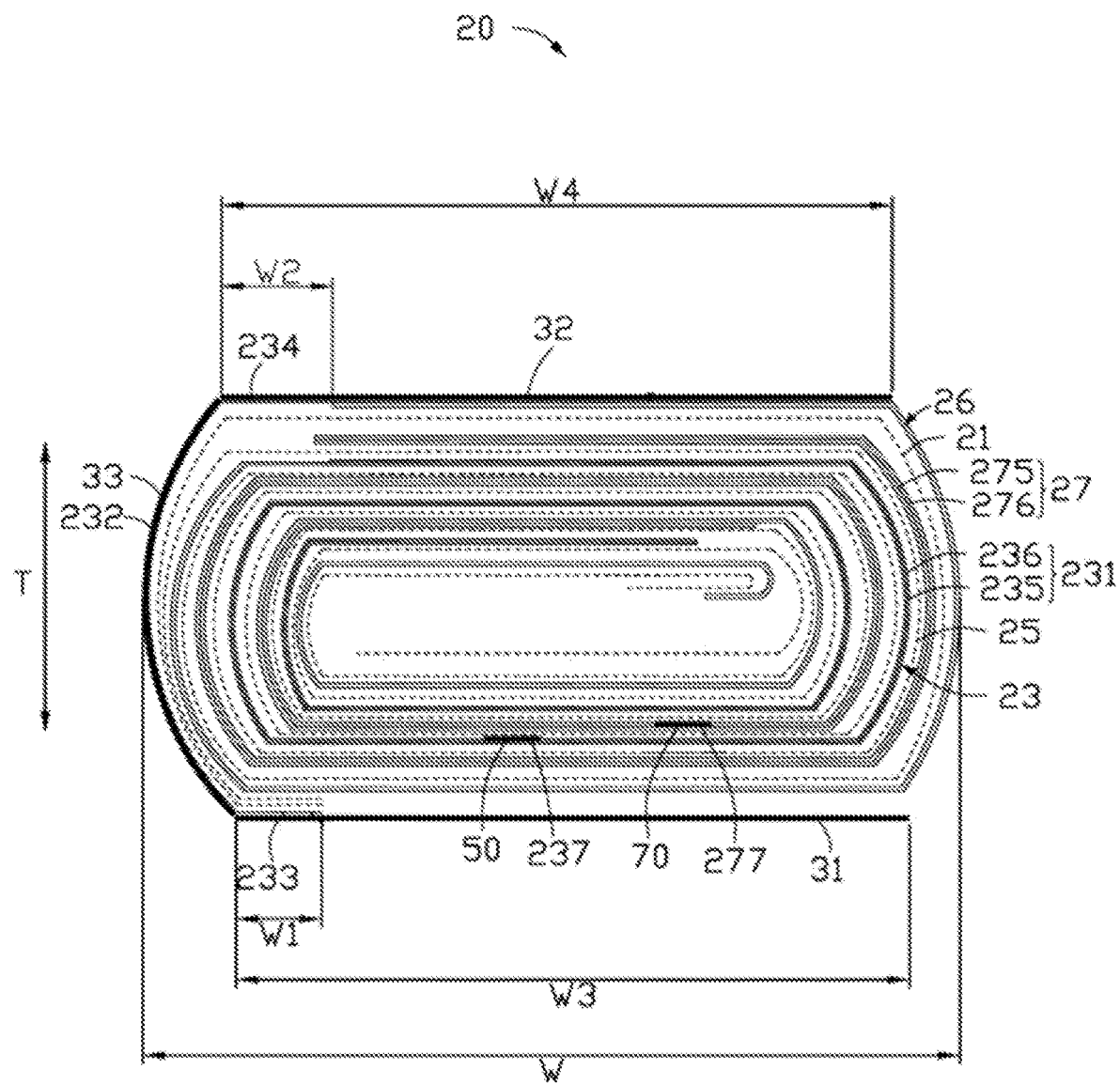
FIG. 2 is a schematic view of a battery cell of FIG. 1.

FIGS. 1 and 2 illustrate an embodiment of a battery 100 including a packaging shell 10, a battery cell 20, and a bonding member 30. The battery cell 20 is packaged in the packaging shell 10, and is adhered to the packaging shell 10 by the bonding member 30. The battery cell 20 is a flat battery cell wound by an electrode assembly, that includes a first electrode plate 23, a first separator 21, a second electrode plate 27, a second separator 25 stacked in that order. A first electrode tab 50 is connected to the first electrode plate 23, a second electrode tab 70 is connected to the second electrode plate 27. The first electrode tab 50 and the second electrode tab 70 extend out of the packaging shell 10. In the embodiment, the first electrode plate 23 is a negative electrode plate, the second electrode plate 27 is a positive electrode plate.

The battery cell 20 includes a first surface 22, a second surface 24 opposite to the first surface 22, and two lateral surfaces 26. Each of the two lateral surfaces connects the first surface 22 and the second surface 24. The first surface 22 and the second surface 24 are adhered to the packaging shell 10 by the bonding member 30. The bonding member 30 includes a first bonding layer 31 and a second bonding layer 32. The first surface 22 is adhered to the packaging shell 10 by the first bonding layer 31, the second surface 24 is adhered to the packaging shell 10 by the second bonding layer 32. Alternatively, the bonding member 30 can cover only one surface of the battery cell 20, the first surface 22 or the second surface 24 then being adhered to the packaging shell 10 by the bonding member 30.

The first electrode plate 23 includes a first current collector 235 and a first active material layer 236 disposed on opposite surfaces of the first current collector 235. The second electrode plate 27 includes a second current collector 275 and a second active material layer 276 disposed on opposite surfaces of the second current collector 275. Materials of the first current collector 235 and the second current collector 275 can be respectively selected from a group consisting of Ni, Ti, Cu, Ag, Au, Pt, Fe, Co, Cr, W, Mo, Al, Mg, K, Na, Ca, Sr, Ba, Si, Ge, Sb, Pb, In, Zn, and any combination (alloy) thereof. Alternatively, the first current collector 235 is an aluminum foil, the second current collector 275 is a copper foil. A material of the first active material layer 236 can be selected from a group consisting of $LiCoO_2$, $LiFePO_4$, other electrochemical active materials capable of deintercalation of lithium ions, and any combination thereof. A material of the second active material layer 276 can be selected from a group consisting of graphite, soft carbon, hard carbon, $Li_4Ti_5O_{12}$, other electrochemical active materials capable of intercalating lithium ions, and any combination thereof. Materials of the first separator 21 and the second separator 25 can be respectively selected from a group consisting of polypropylene (PP), polyethylene (PE), polyvinylidene fluoride (PVDF), polyvinylidene fluoride-hexafluoropropylene copolymer (PVDF-HFP), polymethyl methacrylate (PMMA), polyethylene glycol (PEG), and any combination thereof.

The first active material layer 236 defines a first groove 237 in which the first current collector 235 is exposed. The first electrode tab 50 is received in the first groove 237, electrically connected to the first current collector 235, and configured to conduct electrons of the first current collector 235. The second active material layer 276 defines a second groove 277 in which the second current collector 275 is exposed. The second electrode tab 70 is received in the second groove 277, electrically connected to the second current collector 275, and configured to conduct electrons of the second current collector 275. In a thickness direction T of the battery cell 20, the first electrode tab 50 is not aligned with the second electrode tab 70, reducing a thickness of the battery cell 20. Alternatively, a material of the first electrode tab 50 is aluminum, and a material of the second electrode tab 70 is selected from one or more of Ni and its alloys.

The first electrode plate 23 includes an active material area 231 and an empty foil area connected to each other. The active material area 231 includes the first current collector 235 and the first active material layer 236 disposed on the first current collector 235. The empty foil area only includes the first current collector 235, opposite surfaces of the first current collector 235 do not separately carry the first active material layer 236. A part of the active material area 231 and the empty foil area together constitute an outermost circle of the battery cell 20. The empty foil area includes a first empty foil area 233, a second empty foil area 234, and a third empty foil area 232 located between the first empty foil area 233 and the second empty foil area 234. The third empty foil area 232 connects the first empty foil area 233 and the second empty foil area 234. The second empty foil area 234 is connected to the active material area 231. The first empty foil area 233 is located on the first surface 22, and adhered to the packaging shell 10 by the first bonding layer 31. The first bonding layer 31 partially or completely covers the first empty foil area 233. The second empty foil area 234 is located on the second surface 24, and adhered to the packaging shell 10 by the second bonding layer 32. The second bonding layer 32 partially or completely covers the second empty foil area 234. The third empty foil area 232 is located on one lateral surface 26.

Figure 3:
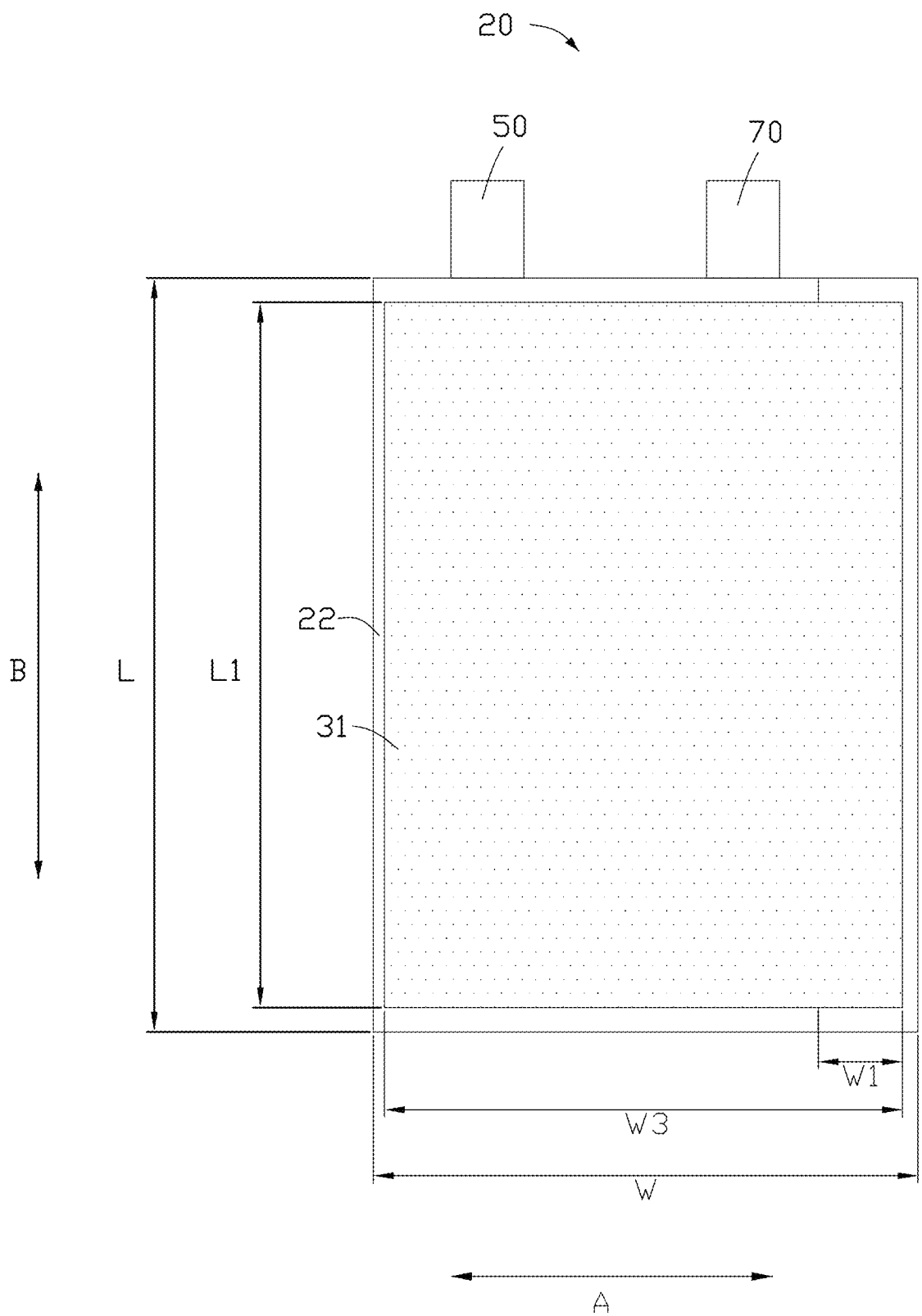
FIG. 3 is a top view of the battery cell of FIG. 1.
Figure 4:
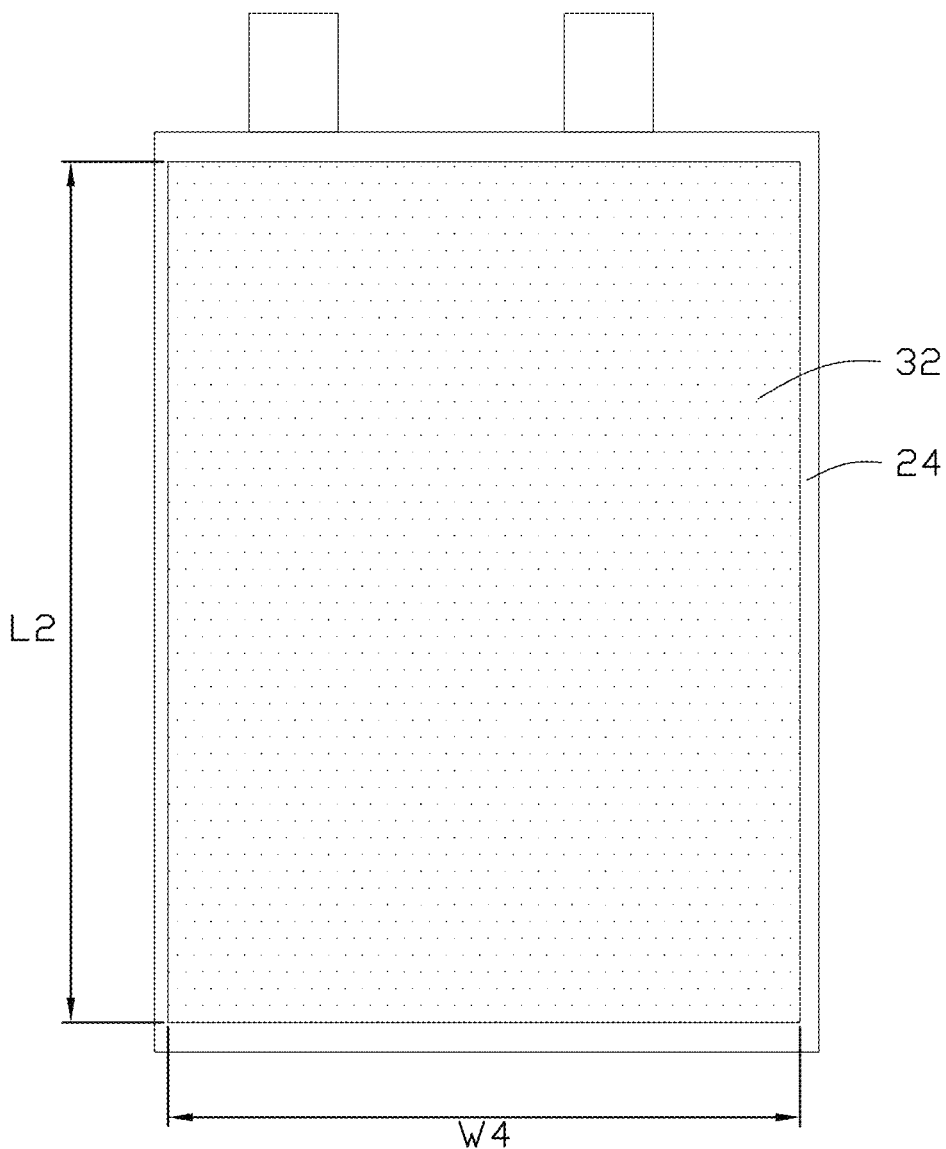
FIG. 4 is a bottom view of the battery cell of FIG. 1.

Referring to FIGS. 2 to 4, in a width direction A of the battery cell 20, a width of the battery cell is W, a width of the first empty foil area 233 is W1, a width of the second empty foil area 234 is W2, where $0 \leq (W1+W2)/W \leq 40\%$. The width direction A is perpendicular to an extending direction of the electrode tab.

In the battery 100 of the present embodiment, by optimizing a straight line length of the empty foil area located on the outermost circle and adhered to the packaging shell 10, a ratio of a width of the empty foil area in the width direction A of the battery cell 20 to the width of the battery cell 20 is less than or equal to 40%. This reduces the possibility of generating debris when anyone of the three empty foil areas are impacted, thereby reducing the risk of short circuit.

Alternatively, $0 \leq (W1+W2)/W \leq 30\%$. After testing, when the ratio of $(W1+W2)/W$ is 30%, the drop and impact resistance of the battery 100 is almost optimal.

The first bonding layer 31 partially or completely covers the first surface 22, the second bonding layer 32 partially or completely covers the second surface 24. In the width direction A of the battery cell 20, a width of the first bonding layer 31 is W3, a width of the second bonding layer 32 is W4, where $80\% \leq W3/W \leq 100\%$, and $80\% \leq W4/W \ 100\%$. In a length direction B of the battery cell 20, a length of the battery cell 20 is L, a length of the first bonding layer is L1, a length of the second bonding layer 32 is L2, where $80\% \leq L1/L \leq 100\%$, and $80\% \leq L2/L \leq 100\%$. The length direction B is parallel to the extending direction of the electrode tab.

The first electrode tab 50 and the second electrode tab 70 are both located on a top of the battery cell 20. The battery cell 20 includes two end faces in the length direction B. Alternatively, the first electrode tab 50 and the second electrode tab 70 can be respectively located on different end faces of the battery cell 20 or be together on one end face.

Furthermore, the bonding member 30 further includes a third bonding layer 33. The third empty foil area 232 is adhered to the packaging shell 10 by the third bonding layer 33. The third bonding layer 33 partially or completely covers the third empty foil area 232.

The bonding member 30 can be an adhesive layer or an adhesive tape. The adhesive of the adhesive layer or the adhesive tape is a pressure sensitive adhesive or a hot melt adhesive. The hot melt adhesive is selected from a group consisting of polyolefin hot melt adhesive, polyurethane hot melt adhesive, ethylene and copolymer hot melt adhesive, polyester hot melt adhesive, polyamide hot melt adhesive, styrene and its blocks copolymer hot melt adhesive, and any combination thereof. The bonding force of the bonding member 30 is 100 to 1000 N/m, and the tensile stress of the bonding member 30 is less than or equal to 4000 N/m. Alternatively, each of the thickness of the first bonding layer 31, the second bonding layer 32, and the third bonding layer 33 is less than or equal to 200 μm.

Figure 5:
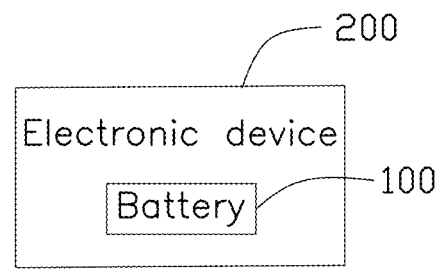
FIG. 5 is a block diagram of an embodiment of the battery according to the present disclosure.

FIG. 5 illustrates an embodiment of an electronic device 200 including the above battery 100. The electronic device 200 can be any known electronic device, such as a mobile phone, a computer, an electric tool, and an electric vehicle.

The present disclosure is illustrated by way of different embodiments and comparative embodiments.

EMBODIMENT 1

The battery cell 20 shown in FIG. 2 was used to prepare ten groups of finished batteries after being filled with electrolyte, encapsulated, and formatted. The width W1 of the first empty foil area 233, the width W2 of the second empty foil area 234, and the width W of the battery cell 20 satisfied (W1+W2)/W=40%. The width W3 of the first bonding layer 31 satisfied W3/W=80%, the width W4 of the second bonding layer 32 satisfied W4/W=80%. The length L1 of the first bonding layer 31 and the length L of the battery cell 20 satisfied L1/L=80%, and the length L2 of the second bonding layer 32 satisfied L2/L=80%.

EMBODIMENT 2

A finished battery was prepared that was substantially the same as the finished battery of embodiment 1 except that W3/W=100%, and L1/L=100%.

EMBODIMENT 3

A finished battery was prepared that was substantially the same as the finished battery of embodiment 1 except that W4/W=100%, and L2/L=100%.

EMBODIMENT 4

A finished battery was prepared that was substantially the same as the finished battery of embodiment 1 except that W3/W=100%, W4/W=100%, L1/L=100%, and L2/L=100%.

EMBODIMENT 5

A finished battery was prepared that was substantially the same as the finished battery of embodiment 1 except that (W1+W2)/W=30%, L1/L=100%, and L2/L=100%.

EMBODIMENT 6

A finished battery was prepared that was substantially the same as the finished battery of embodiment 5 except that W3/W=100%.

EMBODIMENT 7

A finished battery was prepared that was substantially the same as the finished battery of embodiment 5 except that W4/W=100%.

EMBODIMENT 8

A finished battery was prepared that was substantially the same as the finished battery of embodiment 5 except that W3/W=100%, W4/W=100%.

EMBODIMENT 9

A finished battery was prepared that was substantially the same as the finished battery of embodiment 5 except that (W1+W2)/W=15%.

EMBODIMENT 10

A finished battery was prepared that was substantially the same as the finished battery of embodiment 9 except that W3/W=100%.

EMBODIMENT 11

A finished battery was prepared that was substantially the same as the finished battery of embodiment 9 except that W4/W=100%.

EMBODIMENT 12

A finished battery was prepared that was substantially the same as the finished battery of embodiment 9 except that W3/W=100%, W4/W=100%.

EMBODIMENT 13

A finished battery was prepared that was substantially the same as the finished battery of embodiment 5 except that (W1+W2)/W=0.

EMBODIMENT 14

A finished battery was prepared that was substantially the same as the finished battery of embodiment 13 except that W3/W=100%.

EMBODIMENT 15

A finished battery was prepared that was substantially the same as the finished battery of embodiment 13 except that W4/W=100%.

EMBODIMENT 16

A finished battery was prepared that was substantially the same as the finished battery of embodiment 13 except that W3/W=100%, and W4/W=100%.

COMPARATIVE EMBODIMENT 1

The battery cell 20 shown in FIG. 2 was used for ten groups of finished battery after being filled with electrolyte, encapsulated, and formatted. The width W1 of the first empty foil area 233, the width W2 of the second empty foil area 234, and the width W of the battery cell 20 satisfied (W1+W2)/W=50%. The width W3 of the first bonding layer 31 satisfied W3/W=80%, the width W4 of the second bonding layer 32 satisfied W4/W=80%. The length L1 of the first bonding layer 31 and the length L of the battery cell 20 satisfied L1/L=80%, the length L2 of the second bonding layer 32 satisfied L2/L=80%.

COMPARATIVE EMBODIMENT 2

The battery cell 20 shown in FIG. 2 was used for ten groups of finished battery after being filled with electrolyte, encapsulated, and formatted. The width W1 of the first empty foil area 233, the width W2 of the second empty foil area 234, and the width W of the battery cell 20 satisfied (W1+W2)/W=60%. The width W3 of the first bonding layer 31 satisfied W3/W=80%, the width W4 of the second bonding layer 32 satisfied W4/W=80%. The length L1 of the first bonding layer 31 and the length L of the battery cell 20 satisfied L1/L=80%, the length L2 of the second bonding layer 32 satisfied L2/L=80%.

COMPARATIVE EMBODIMENT 3

A battery was prepared, which included a packaging shell and a battery cell within. An outermost circle of the battery cell included an empty foil area, a ratio of a width of the empty foil area in a width direction of the battery cell to a width of the battery cell was 50%, the battery was not adhered to the packaging shell by a bonding member.

Drop and impact tests were performed on the finished batteries provided in examples 1 to 16 and comparative examples 1 to 3, the test conditions and results are shown in Table 1. The drop testing method is to drop a battery from a height of 1.5 m after installing the battery in a special fixture. After the drop, if an empty foil area of the battery cell was not torn, the drop test is passed. The impact testing method for heavy objects is to place a metal rod with a diameter of 15.8 mm±0.1 mm horizontally at the center of an surface of the battery, and drop a heavy object with a weight of 9.1 kg±0.1 kg from a height of 610 mm±25 mm to hit the metal rod. If the tested battery did not explode or catch fire, it passed the test.

Table 1 shows that the pass rates in drop and impact testing of the batteries prepared in the present disclosure are high. With the decrease of the ratio of (W1+W2)/W, the pass rates are increased. When (W1+W2)/W is greater than 40%, the pass rates through drop and impact testing of the battery are low and when (W1+W2)/W is less than 30%, with the decrease of value of (W1+W2)/W, the pass rate through drop and impact testing increase less. With the increase of the ratio of W3/W and/or the ratio of W4/W, the pass rates through drop and impact testing of the battery also increase.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A battery comprising:
   a packaging shell; and
   a battery cell formed by winding an electrode assembly, the battery cell being disposed in the packaging shell,
   wherein the electrode assembly comprises a first electrode plate,
   the first electrode plate comprises a first current collector area having a first active material layer disposed on opposite surfaces of the first current collector area, a first empty foil area and a second empty foil area, wherein both surfaces of the first empty foil area and the second empty foil area are not disposed with the first active material layer,
   the battery cell has a first surface and a second surface opposite to each other, the first empty foil area is located on the first surface, and the second empty toil area is located on the second surface;
   wherein, at least one of the first surface and the second surface of the battery cell is adhered to the packaging shell by a bonding member,

TABLE 1

| | Value of (W1 + W2)/W | Value of W3/W | Value of W4/W | Value of L1/L | Value of L2/L | Pass rate of drop test | Pass rate of impact test |
|---|---|---|---|---|---|---|---|
| Embodiment 1 | 40% | 80% | 80% | 80% | 80% | 4/10 | 10/20 |
| Embodiment 2 | 40% | 100% | 80% | 100% | 80% | 5/10 | 10/20 |
| Embodiment 3 | 40% | 80% | 100% | 80% | 100% | 5/10 | 10/20 |
| Embodiment 4 | 40% | 100% | 100% | 100% | 100% | 5/10 | 10/20 |
| Embodiment 5 | 30% | 80% | 80% | 100% | 100% | 9/10 | 17/20 |
| Embodiment 6 | 30% | 100% | 80% | 100% | 100% | 10/10 | 17/20 |
| Embodiment 7 | 30% | 80% | 100% | 100% | 100% | 10/10 | 17/20 |
| Embodiment 8 | 30% | 100% | 100% | 100% | 100% | 10/10 | 18/20 |
| Embodiment 9 | 15% | 80% | 80% | 100% | 100% | 9/10 | 17/20 |
| Embodiment 10 | 15% | 100% | 80% | 100% | 100% | 10/10 | 17/20 |
| Embodiment 11 | 15% | 80% | 100% | 100% | 100% | 10/10 | 17/20 |
| Embodiment 12 | 15% | 100% | 100% | 100% | 100% | 10/10 | 18/20 |
| Embodiment 13 | 0 | 80% | 80% | 100% | 100% | 9/10 | 17/20 |
| Embodiment 14 | 0 | 100% | 80% | 100% | 100% | 10/10 | 17/20 |
| Embodiment 15 | 0 | 80% | 100% | 100% | 100% | 10/10 | 17/20 |
| Embodiment 16 | 0 | 100% | 100% | 100% | 100% | 10/10 | 18/20 |
| Comparative embodiment 1 | 50% | 80% | 80% | 80% | 80% | 2/10 | 5/20 |
| Comparative embodiment 2 | 60% | 80% | 80% | 80% | 80% | 2/10 | 5/20 |
| Comparative embodiment 3 | 50% | — | — | — | — | 0/10 | 5/20 | in a width direction of the battery cell, a width of the battery cell is W, a width of the first empty foil area is W1, a width of the second empty foil area is W2, and $0 \leq (W1+W2)/W \leq 40\%$.

2. The battery of claim 1, wherein $0 \leq (W1+W2)/W \leq 30\%$.

3. The battery of claim 1, wherein the bonding member comprises a first bonding layer and a second bonding layer, the first surface is adhered to the packaging shell by the first bonding layer, and the second surface is adhered to the packaging shell by the second bonding layer.

4. The battery of claim 3, wherein in the width direction of the battery cell, a width of the first bonding layer is W3, a width of the second bonding layer is W4, wherein, $80\% \leq W3/W \leq 100\%$, and $80\% \leq W4/W \leq 100\%$.

5. The battery of claim 3, wherein in a length direction of the battery cell, a length of the battery cell is L, a length of the first bonding layer is L1, a length of the second bonding layer is L2, wherein, $80\% \leq L1/L \leq 100\%$, $80\% \leq L2/L \leq 100\%$.

6. The battery of claim 1, wherein the first electrode plate further comprises a third empty foil area, and the third empty foil area is connected between the first empty foil area and the second empty foil area.

7. The battery of claim 6, wherein the bonding member comprises a third bonding layer, and the third empty foil area is adhered to the packaging shell by the third bonding layer.

8. The battery of claim 1, wherein the first active material layer defines a first groove in which the first current collector area is exposed; and
the battery cell further comprises a first electrode tab, and the first electrode tab is received in the first groove and is electrically connected to the first current collector area.

9. The battery of claim 8, wherein
the electrode assembly further comprises a second electrode plate and the battery cell further comprises a second electrode tab;
the second electrode plate comprises a second current collector and a second active material layer is disposed on the second current collector; and
the second active material layer defines a second groove in which the second current collector is exposed, and the second electrode tab is received in the second groove and is electrically connected to the second current collector.

10. The battery of claim 9, wherein the first electrode plate is a negative electrode plate, and the second electrode plate is a positive electrode plate.

11. The battery of claim 1, wherein the bonding member is an adhesive tape or an adhesive layer.

12. The battery of claim 1, wherein the bonding force of the bonding member is 100 to 1000 N/m, and the tensile rupture stress of the bonding member is less than or equal to 4000 N/m.

13. The battery of claim 1, wherein in a thickness direction of the battery cell, a thickness of the bonding member located on the first surface and a thickness of the bonding member located on the second surface are less than or equal to 200 μm.

14. An electronic device comprising a battery, the battery comprising:
a packaging shell; and
a battery cell formed winding an electrode assembly, the battery cell being disposed in the packaging shell,
wherein the electrode assembly comprises a first electrode plate,
the first electrode plate comprises a first current collector area having a first active material layer disposed on opposite surfaces of the first current collector area, a first empty foil area and a second empty foil area, wherein both surfaces of the first empty foil area and the second empty foil area are not disposed with the first active material layer,
the battery cell has a first surface and a second surface opposite to each other, the first empty foil area is located on the first surface, and the second empty foil area is located on the second surface;
wherein, at least one of the first surface and the second surface is adhered to the packaging shell by a bonding member,
in a width direction of the battery cell, a width of the battery cell is W, a width of the first empty foil area is W1, a width of the second empty foil area is W2, and $0 \leq (W1+W2)/W \leq 40\%$.

15. The electronic device of claim 14, wherein the bonding member comprises a first bonding layer and a second bonding layer, the first surface is adhered to the packaging shell by the first bonding layer, and the second surface is adhered to the packaging shell by the second bonding layer.

16. The electronic device of claim 15, wherein in the width direction of the battery cell, a width of the first bonding layer is W3, a width of the second bonding layer is W4, wherein, $80\% \leq W3/W \leq 100\%$, and $80\% \leq W4/W \leq 100\%$.

17. The electronic device of claim 15, wherein in a length direction of the battery cell, a length of the battery cell is L, a length of the first bonding layer is L1, a length of the second bonding layer is L2, wherein, $80\% \leq L1/L \leq 100\%$, $80\% \leq L2/L \leq 100\%$.

18. The electronic device of claim 14, wherein the first electrode plate further comprises a third empty foil area, and the third empty foil area is connected between the first empty foil area and the second empty foil area.

19. The electronic device of claim 18, wherein the bonding member comprises a third bonding layer, and the third empty foil area is adhered to the packaging shell by the third bonding layer.

20. The electronic device of claim 14, wherein the first active material layer defines a first groove in which the first current collector area is exposed; and
the battery cell further comprises a first electrode tab, and the first electrode tab is received in the first groove and is electrically connected to the first current collector area.

\* \* \* \* \*